US010768605B2

(12) United States Patent
Dalal et al.

(10) Patent No.: US 10,768,605 B2
(45) Date of Patent: Sep. 8, 2020

(54) AUGMENTED REALITY (AR) BASED FAULT DETECTION AND MAINTENANCE

(71) Applicant: ACCENTURE GLOBAL SOLUTIONS LIMITED, Dublin (IE)

(72) Inventors: Tanmay Dalal, Ahmedababd (IN); Prakhar Chaudhary, Ghaziabad (IN); Aabhas Vincent, Ajmer (IN); Lukish Rajesh Yadav, Chinchwad (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 122 days.

(21) Appl. No.: 16/121,744

(22) Filed: Sep. 5, 2018

(65) Prior Publication Data
US 2020/0026257 A1  Jan. 23, 2020

(30) Foreign Application Priority Data
Jul. 23, 2018  (IN) .............................. 201811027619

(51) Int. Cl.
G05B 19/4063 (2006.01)
G06N 5/02 (2006.01)
(Continued)

(52) U.S. Cl.
CPC ..... G05B 19/4063 (2013.01); G06K 9/00671 (2013.01); G06K 9/00718 (2013.01);
(Continued)

(58) Field of Classification Search
CPC ............ G05B 2219/32014; G05B 1/00; G05B 19/4063; G06F 3/048; G06F 3/011; G06F 3/04842; G06F 3/0683; G06F 3/0304; G06K 2209/19; G06K 2209/23; G06K 9/00711; G06K 9/6269; G06K 9/00671; G06K 9/00771; G06K 9/6293; G06K 9/626; G06T 11/60; G06T 19/006; G06T 19/20; G06T 2200/24; G06T 7/97; G06T 2207/20084; G06T 7/0006; G06T 19/003; G06T 15/00; H04M 2201/50;
(Continued)

(56) References Cited

U.S. PATENT DOCUMENTS 6,650,779 B2 * 11/2003 Vachtesvanos ...... G01N 21/956
348/88
7,024,399 B2 * 4/2006 Sumner, II .......... G06F 19/3481
706/45
(Continued)

Primary Examiner — Aklilu K Woldemariam
(74) Attorney, Agent, or Firm — Mannava & Kang, P.C.

(57) ABSTRACT

An AR based fault detection and maintenance system analyzes real-time video streams from a remote user device to identify a specific context level at which a user is to handle an equipment and provides instructions corresponding to the specific context level. The instructions enable generating AR simulations that guide the user in executing specific operations including repairs on faulty components of the equipment. The received video stream is initially analyzed to identify a particular equipment which is to be handled by the user. Fault prediction procedures are executed to identify faults associated with the equipment. The instructions to handle the faults are transmitted to the user device as AR simulations that provide step-by-step simulations that enable the user to execute operations as directed by the instructions.

20 Claims, 10 Drawing Sheets

(51) Int. Cl.
*G06K 9/00* (2006.01)
*G06T 19/20* (2011.01)
*G06T 13/20* (2011.01)
*G06T 19/00* (2011.01)

(52) U.S. Cl.
CPC ............... *G06N 5/02* (2013.01); *G06T 13/20* (2013.01); *G06T 19/006* (2013.01); *G06T 19/20* (2013.01); *G05B 2219/24093* (2013.01); *G06T 2210/21* (2013.01); *G06T 2219/2016* (2013.01)

(58) Field of Classification Search
CPC .......... H04M 2203/651; H04N 13/366; H04N 7/181; H04N 21/23412; H04N 13/271; H01L 21/67745; H01L 21/67253; H01L 22/20; G06N 5/022; G06N 20/00; G06Q 10/20; G16H 50/50; H04L 41/22; H04L 63/10; B64D 45/0015; B64D 45/0053; G08B 17/125; G01N 21/956; G02B 27/0093; A63F 13/20; A63F 2300/1075
USPC ........... 382/190, 218; 706/11, 45, 46, 47, 60
See application file for complete search history.

(56) References Cited

U.S. PATENT DOCUMENTS

| | | | |
|---|---|---|---|
| 9,881,234 B2 | 1/2018 | Huang et al. | |
| 10,311,442 B1* | 6/2019 | Lancaster | G06N 5/022 |
| 2005/0069207 A1* | 3/2005 | Zakrzewski | G06K 9/629 |
| | | | 382/190 |
| 2009/0138415 A1* | 5/2009 | Lancaster | G06N 5/04 |
| | | | 706/11 |
| 2015/0091941 A1* | 4/2015 | Das | G06F 3/017 |
| | | | 345/633 |
| 2015/0206329 A1* | 7/2015 | Devries | G06F 16/583 |
| | | | 345/633 |
| 2015/0339570 A1* | 11/2015 | Scheffler | G06N 3/04 |
| | | | 706/16 |
| 2016/0140868 A1* | 5/2016 | Lovett | G06T 19/006 |
| | | | 434/118 |
| 2018/0131907 A1 | 5/2018 | Schmirler et al. | |
| 2018/0159979 A1 | 6/2018 | Amir et al. | |
| 2018/0218540 A1* | 8/2018 | Sridharan | H04N 7/181 |
| 2019/0306434 A1* | 10/2019 | Annau | G06T 19/006 |
| 2019/0324634 A1* | 10/2019 | Gao | G06F 3/04815 |
| 2019/0325368 A1* | 10/2019 | Turney | G06Q 10/06315 |

* cited by examiner

AUGMENTED REALITY (AR) BASED FAULT DETECTION AND MAINTENANCE

PRIORITY

The present application claims priority under 35 U.S.C. 119(a)-(d) to the Indian Patent Application No. 201811027619, having a filing date of Jul. 23, 2018, the disclosure of which is hereby incorporated by reference in its entirety.

BACKGROUND

Heavy industrial establishments such as manufacturing plants, power plants, refinery units and the like include numerous machines that interface to execute complex processes. Due to the various degradation processes or damage mechanisms such as thermal degradation, corrosion, water damage, friction or regular wear-and-tear, the machinery can be damaged or become weak. A faulty machine or equipment when interacting with other pieces of machinery can cause damage to the other machinery. Moreover, faulty machinery can be unsafe and lead to accidents. Regular inspections and maintenance schedules are required in order to keep the machines running smoothly and reliably. Fault detection systems can be used to monitor the machines, identify any faults or defects occurring in the machines and help operators or technicians to isolate and repair the faults. Fault detection is generally used in high cost machinery and safety-critical procedures.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
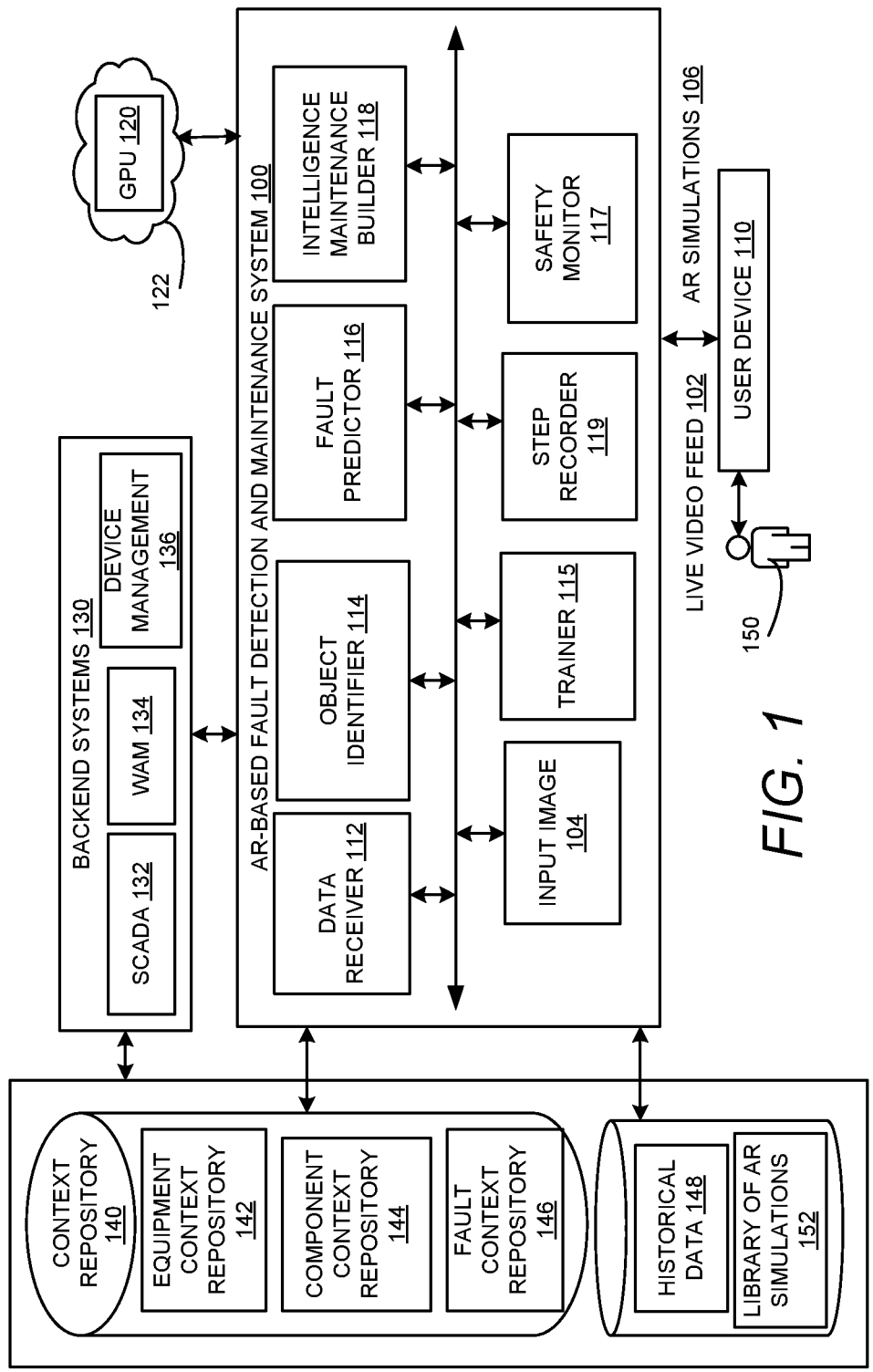
FIG. 1 is a block diagram that shows an AR-based fault detection and maintenance system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

The AR-based fault detection and maintenance system as disclosed herein employs use of artificial intelligence (AI) elements in AR realm to identify faults in real-time and dynamically build an AR-based fault resolution guide including instructions for actions that a user is to implement in a current scenario. The maintenance system as disclosed herein receives real-time video feed or a live video feed from a user device, analyzes the live video feed to identify a context level at which the user is to handle an equipment and provides appropriate instructions to the user via AR simulations thereby providing step-by-step instructions to the user in handling the equipment. In case the equipment includes one or more faulty components, the maintenance system is also configured to identify the faults and provide instructions to address the faults. A context level in accordance with examples disclosed herein can correspond to a particular state of an object or an equipment. A plurality of context levels can be defined for the equipment. By the way of illustration and not limitation, the context levels can include an equipment context level, a component context level, and a fault context level. It can be appreciated that a procedure implemented on the equipment can involve the plurality of context levels or a subset of the plurality of context levels. For example, when a routine maintenance procedure is executed on the equipment, the fault context level may not be accessed. Certain example context levels may be defined in a hierarchical manner from a first context level e.g., the equipment context to a final context level, e.g., the fault context. It can be appreciated that the user 150 can navigate the context levels serially in accordance with the hierarchy or in parallel where the user 150 executes actions or operations associated with multiple context levels simultaneously.

The live video stream received by the maintenance system is analyzed to identify a particular equipment. In an example, technologies such as darknet, YOLO can be employed for real time object detection. An initial image of the equipment can be split into n×n grid which is analyzed by a machine learning (ML) element such as a CNN. The output of the CNN can be a prediction that includes multiple bounding boxes and class probabilities for the multiple bounding boxes. The CNN can be trained on a full image so that the predictions generated are informed by the global context in the image.

On detecting the equipment to be worked on by the user, the maintenance system can begin to provide instructions to the user based on a current context level. The maintenance system is configured to keep track of the changes in the current context level from one context level to the next context level, until it is detected that the user has progressed to a final context level. Initially the user handles the equipment at the equipment context level and information for the instructions can be retrieved from a corresponding equipment context repository. The user on completing instructions associated with the equipment context level can progress to the component context level. The maintenance system automatically detects that the user has completed the operations required by the instructions of the equipment context level by analyzing the live video feed in accordance with procedures described herein. In an example, the user can provide explicit audio, video, textual or gesture input communicating to the maintenance system regarding the completion of instructions associated with the current context level. In this case, certain implementations may take the user's explicit input as an override signal and proceed with providing instructions associated with the component context level. On detecting the user's completion of instructions associated with the equipment context level, the maintenance system can automatically retrieve instructions corresponding to the component context level. Again, instructions corresponding to the component context level can be retrieved from a component context repository. These instructions enable the user to handle various components of the equipment to carry out tasks such as but not limited to, assembling the equipment, disassembling the equipment, repairing a faulty component or replacing a part and the like.

In an example, an initial image of the particular equipment to be handled by the user is analyzed to extract features. The features thus extracted can be employed to classify the image of the equipment into one or more of a plurality of fault classes. A convolutional neural network (CNN) can be employed to determine if any faults are identified. Accordingly, the user handles the equipment at a fault context level and corresponding instructions from a fault context repository can be retrieved and transmitted to the user who proceeds to execute operations as instructed. Fault resolution steps can be selected based on the severity of the fault detected. In an example, the user can independently execute operations that are not included in the instructions. When, such newer operations are detected, the maintenance system is configured to record such operations and employ them for further training.

The instructions provided to the user at each of the context levels can include textual, audio and video data. In an example, the maintenance system enables the user device to provide AR simulations that guide the user in executing the various operations. The AR simulations can involve 3D, holographic projections that interface with the image of the equipment which is displayed on a screen of the user device. Techniques such as spatial mapping and point cloud can be used to provide the 3D holographic projections.

Many machines even to this day require manual inspection for maintenance and/or for fault detection purposes. Some inspection protocols rely on technicians' expertise to detect and fix faults. Most of the AR solutions for inspections may assist technicians but do not pro-actively identify faults by pointing out an area of concern in the equipment and guiding the technician to resolve the concerns in the AR environment. As a result, the technician may have to reach out to other experts in the field upon a failure to detect or resolve the faults. This is a result of a lack of synergy between the fault detection and resolution in real-time in AR environment.

The maintenance system as outlined herein addresses the aforementioned issues by enabling automatic fault detection and guided maintenance using AR simulations at multiple context levels. Augmented reality technologies provide interactive user experiences whereby real-world objects are augmented with computer-generated simulations. The computer-generated simulations that are overlaid on the real-world objects can provide multi-sensory experiences wherein users receive audio, video, haptic stimuli are used to enhance a user's perception of the real-world. The AR technology can be used in a variety of fields including manufacturing. The ability to automatically sense in real-time the completion of operations associated with a context level prior to providing instructions of a next context level enable the maintenance system to wait for the user to complete operations suggested by the instructions of a particular context level before providing instructions for a next context level, thereby, enabling step-by-step guidance of the user through complex procedures.

FIG. 1 is a block diagram that shows the AR-based fault detection and maintenance system 100 in accordance with the examples disclosed herein. The maintenance system 100 is communicatively coupled to a user device 110 which may be remotely located to receive data such as a live video stream or a real-time video feed 102. The user device 110 can include augmented reality devices such as SMART glasses, smart phones, tablet devices, laptops, and other devices that are capable of transmitting live video feed and displaying received instructions including the AR simulations 106 to the user 150. The live video feed 102 is transmitted by the user device 110 from an environment that can include one or more faulty equipment. The environment can be associated with various settings or facilities such as industrial, residential or office environment. Industrial establishments can include but are not limited to, factories and other manufacturing units, power plants, oil drilling platforms, refineries, chemical plants and the like. The maintenance system 100 can be used to execute operations such as assembling, disassembling, repair and maintenance of large and small hardware items found in the various facilities/establishments such as machines, drills, generators, pipelines or digital equipment such as computers, office equipment, furniture, gadgets, toys, and the like.

The received video feed 102 is analyzed while maintaining communication with the user device 110 in order to obtain an input image 104 which is analyzed to identify the specific faulty equipment which requires handling. Based on the information received from the live video feed 102, instructions can be transmitted to the user device 110 stepwise for handling the faulty equipment. Therefore, as the user 150 completes instructions associated with each step before the set of instructions associated with the next step are transmitted. Furthermore, the maintenance system 100 also includes certain ML elements such as a trainer 115 so that if the user 150 implements any new or additional steps not included in the instructions transmitted for that step, the maintenance system 100 can learn that step. When, the instructions for that step are transmitted the next time, the learnt new or additional steps can be included. Hence the maintenance system 100 learns and improves with usage over time.

In an example the maintenance system 100 includes a data receiver 112, an AI-based object identifier 114, a fault predictor 116 and intelligent maintenance builder 118. The maintenance system can also be connected to a graphic processing unit (GPU) 120 for analyzing the live video feed 102 and for transmitting the appropriate visual data. The GPU 120 can be located on a cloud platform 122 in an example. The maintenance system 100 can also be connected to a data lake 160 which can be further coupled to backend systems 130 such as Supervisory Control and Data Acquisition (SCADA) 132, Work and Asset Management (WAM) 134, device management 136 and the like. The information from the backend systems 130 can be used for the analysis of the live video feed 102 and identification of the appropriate instructions to be transmitted at each step of the maintenance procedure being executed by the user 150.

The AI-based object identifier 114 analyses the live video feed 102 to extract an input image 104 of an equipment on which the user is to execute the maintenance procedure. In an example, the equipment can include one or more faults. It can be appreciated that the maintenance procedure can involve maintenance and/or repair functions such as replacing component parts, replenishing required fluids, carrying out a procedure on one or more of the component parts and the like. The input image 104 can be obtained as the user 150 pauses at the faulty equipment which needs the maintenance even as the live video feed 102 is received from the user device 110. In an example, identifying indicia such as an equipment id tag located for example, on an outer body of the equipment can be identified from the input image 104 using image analysis. The backend systems 130 are searched for information pertaining to the faulty equipment using the equipment id as obtained from the input image 104.

The object identifier 114 can include AI elements such as but not limited to a convolutional neural network (CNN) to analyze the input image 104. As per the CNN architecture, the input image 104 which corresponds to a selected frame of the live video feed 102 can be passed as a (n×n) grid of cells. The output of the object identifier 114 can be class probability map corresponding to an identification of the faulty equipment. Upon identifying the faulty equipment, the object identifier 114 continues to analyze the live video feed 102 in a similar manner by splitting the images received at each context level in real-time and then determining the class probabilities of the resulting images in order to determine the various stages or context levels at which the user 150 is dealing with the faulty equipment.

The different levels can have different repositories associated therewith. The different context repositories 140 include details about the equipment at a particular level which can enable guiding the user 150 from one context level to another, deeper context level thereby guiding the user 150 in dealing with the components, parts or the sub-systems of the faulty equipment. The different repositories can include, without limitation, an equipment context repository 142, a component context repository 144 and a fault context repository 146. Upon initial identification of the faulty equipment, information from the equipment repository 142 is retrieved to guide the user 150 into the next, context level. The guidance can be provided to the user 150 in the form of text, audio and/or video instructions transmitted to the user device 110 in accordance with examples as further detailed herein. From the equipment context level, the user 150 is guided to the component context level. Information regarding the various components within the equipment (which includes the faulty equipment) is stored in the component context repository 144.

The user 150 on executing the steps per the information received from the equipment context repository 142 and the component context repository 144 reaches the fault context level. The faulty component is therefore identified as the user 150 reaches the fault context level. The fault context repository 146 can include information such as but not limited to, the identity of the faulty component, the type of fault associated with the component and the steps to be executed to handle the fault. At this stage the live video feed 102 can be transmitted to the fault predictor 116 which further analyzes the images from the live video feed 102 to determine the faults associated with one or more of the components within the faulty equipment. The fault predictor 116 can be configured to classify the images of the faulty components into one or more of a plurality of fault classes based on image analysis by, for example, an AI-based fault identifying element. In an example, the AI-based fault identifying element includes a trained convolutional neural network (CNN) that obtains pixelated images from the data receiver 112 and executes a convolution function on the pixelated images to obtain a further convulsion image. The convolution image can include high-level features of the component images. The high-level features are used to classify the faulty component into one or more of the plurality of fault classes.

The information regarding the context levels and the fault(s) if any that may be present at that context level can be transmitted to the intelligence maintenance builder 118. The intelligence maintenance builder 118 identifies one or more respective resolution steps to be executed by the user 150 for that context level. The corresponding AR simulations to be displayed to the user 150 are selected from a library of AR simulations 152 and transmitted to the user device 110 for display to the user 150. It can be appreciated that the resolution steps associated with the particular context level may involve only re-arrangement and/or dissembling of the faulty equipment/component and may not have any fault data associated therewith.

The builder 118 obtains information regarding the resolution steps from one or more of the equipment context repository 142, component context repository 144, fault context repository 146 and historical data 148 which can include past resolution steps that were previously implemented. In an example wherein the context level involves fault data, the builder 118 can include a fuzzy fault validator. The fuzzy fault validator, along with the context repositories 140 mentioned herein, enables selecting the best possible resolution step(s) for the fault based at least on the historical data 148 recorded for the same fault type.

The information regarding the resolution step(s) is used to select one or more corresponding AR simulations 106. The AR simulations 106 enable generating image overlay(s) on an image of the faulty equipment/component that is displayed on a screen of the user device 110. Again, it may be noted that the image overlays are generated corresponding to the various context levels. Some AR simulations therefore may only instruct the user 150 in disassembling/rearranging the component(s) of the faulty equipment. Some AR simulations 106 which include fault data can provide instructions to the user 150 to perform at least an act in addressing specific faults identified at particular context levels. Again the precise placement of the AR simulations require synchrony between the live video feed 102 and the video animations associated with the AR simulations. Some types of user devices may not have the processing power to analyze the live video stream in real-time to enable the precise placement of the AR simulations, as such the GPU 120 can be used for the spatial mapping and point cloud analysis that enable the precise placement of the AR simulations 106 on the user device 110. Upon resolving the faults, further preventive steps to mitigate future damage or other maintenance can be suggested to the user 150 to close the maintenance/repair process.

The maintenance system 100 also includes a step recorder 119 which records any additional steps that may be executed by the user 150 during the repair/maintenance of the faulty equipment. The additional steps thus recorded can be used for further training of one or more of the object identifier 114, fault predictor 116 and builder 118. The maintenance system 100 as disclosed herein enables fault detection, repair and prevention in real-time using AR devices. Furthermore, future faults can be predicted from the live video feed 102, thereby enabling implementation of preventive procedures addressing the future faults. The future fault prediction addresses problems with inexperienced manual operators whom may not be able to make out future faults based on the current appearance of the components. Since, the maintenance system 100 is trained on images of the equipment as a whole, any discrepancies in the equipment can be identified and related information can be retrieved from the context level repositories thereby enhancing productivity of the field operators. In a further example, the maintenance system 100 can also include a safety monitor 117 that enforces mandatory safety procedures. For example, the AR simulations may not commence until the safety monitor 117 detects that the user 150 has implemented the mandatory safety procedures such as wearing proper gear, possessing specific tools and the like.

Figure 2:
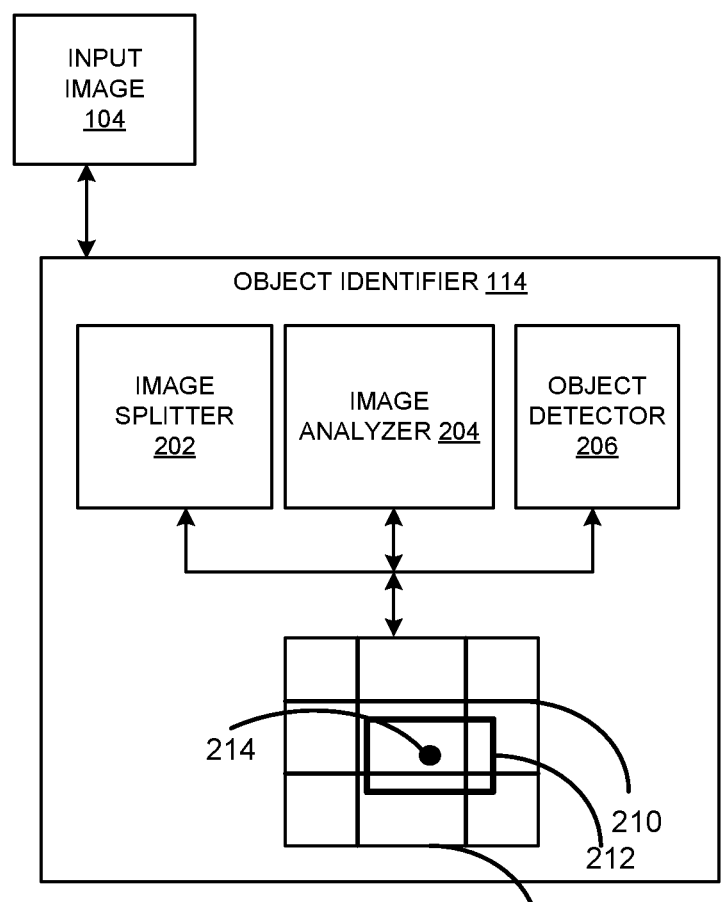
FIG. 2 shows a block diagram of an object identifier in accordance with the examples disclosed herein.

FIG. 2 shows a block diagram of the object identifier in accordance with examples disclosed herein. The object identifier 114 includes an image splitter 202, image analyzer 204 and object detector 206. The maintenance system 100 is configured to handle at about 40 frames per second with no batch processing. A faster version can run at more than 150 frames per second so that the object identifier 114 can process streaming video in real time with less than about 25 milliseconds of latency. When the user 150 arrives at the faulty equipment, identifying indicia such as an equipment ID recognized from a tag on an outer cover of the faulty equipment can be used to uniquely identify that equipment. Accordingly the initial image 124 is obtained by isolating one of the video frames imaging the faulty equipment. The image splitter 202 is configured to split the input image 104 into n×n grid of cells.

Image detection is framed as a regression problem in the maintenance system 100 so that the need for a complex pipeline for image analysis is mitigated. The n×n grid is transmitted to the image analyzer 204 which estimates class probabilities for each of the multiple grid cells. The image analyzer 204, in one example, includes CNN architecture wherein a single convolution network can simultaneously predict multiple bounding boxes and class probabilities for those boxes. The CNN iteratively analyses the input image 104 by estimating the convolution function and sub sampling selected grid cells of the convoluted image.

By the way of illustration and not limitation, the initial image 104 can be divided into nine grid cells (3×3) wherein the bounding boxes can be detected for the objects in the initial image 104. Below are shown equations for the bounding box detection:

$$bx = \text{sigma}(tx) + cx \quad (\text{Eq. 1})$$

$$by = \text{sigma}(ty) + cy \quad (\text{Eq. 2})$$

$$bw = pw * e^{tw} \quad (\text{Eq. 3})$$

$$bh = ph * e^{th} \quad (\text{Eq. 4})$$

wherein cx, cy are grid coordinates, pw, ph are anchor dimensions and tx, ty are previous bounding box coordinates.

The input image 104 along with the class probability map and bounding boxes is transmitted to the object detector 206 for uniquely detecting the faulty equipment associated with the equipment ID or a specific component thereof. If the objects in the images are too close together then anchor box approach can be used. Each object in the training image can be assigned to the grid cell that contains the object's midpoint and anchor point for the grid cell with highest IOU (input output utility). The dimensional formulae used for the anchor box approach are shown below:

$$\text{Output dimension} = M \times N \times (B \times (5+C)) \quad (\text{Eq. 5})$$

$$\text{Dimension of target vector} = (B \times (5+C)) \quad (\text{Eq. 6})$$

wherein M, N are the dimensions of the grid. In the example discussed above, a 3×3 grid 210 with nine grid cells and B number of anchor boxes is considered. The grid cell containing the midpoint 214 of the bounding box 212 can be identified as corresponding to the faulty equipment associated with the equipment ID. So, the faulty equipment is localized to the grid cell having the midpoint 214. For example, the grid cell (2,2) is identified as including an image of the faulty equipment.

The CNN is trained on complete images and directly optimizes detection performance. This enables the image analyzer 204 to reason globally about the image when identifying specific elements. This is because unlike sliding window or other region proposal based technique, the image analyzer 204 receives an entire image during training and hence at test time it implicitly encodes contextual information about classes as well as their appearance. Thirdly the image analyzer 204 learns generalizable representations of objects when trained on natural images and tested on art work.

Figure 3:
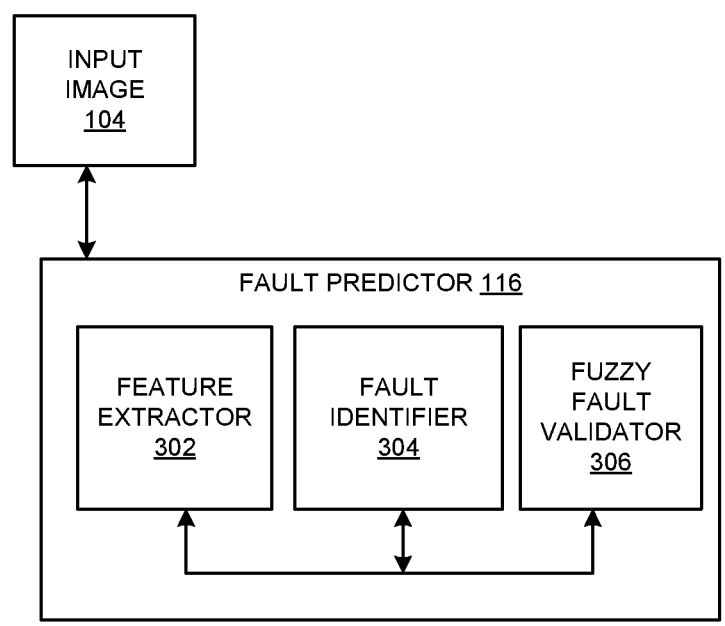
FIG. 3 shows a block diagram of a fault predictor in accordance with the examples disclosed herein.

FIG. 3 shows a block diagram of the fault predictor 116 in accordance with examples disclosed herein. The fault predictor 116 includes feature extractor 302, an AI-based fault identifier 304, and a fuzzy fault validator 306. Depending on the context level currently under the analysis, the initial image 104 or image of one of the components of the faulty equipment can be received by the feature extractor 302. In an example, RLU (Rectified linear unit) normalizes the pixels from the previous steps i.e., removes the negative values. In an example, the feature extractor 302 can include trained classifiers to extract features from the received images.

The features thus extracted from the received image are used to classify the received image into one or more of a plurality of fault classes by the fault identifier 304. In an example, the fault identifier 304 can integrate a CNN with classifiers such as but not limited to artificial neural networks (ANN), Naive Bayes (NB) and the like. The hyperparameters (knobs) and number of layers of each type in the CNN can be design choices. In an example, the CNN can be trained on images of various classes that show components damaged due to burn, thermal damage, water damage, corrosion, wear & tear and the like. For example, an electric motor can have associated faults such as burnt stator, cooling fan issue, rotor issue, terminal box issue, dry shaft issue, and the like which can make up the fault classes associated with an equipment such as a motor. In one example, the output from the fault identifier 304 can include textual data indicative of the fault type that was detected. Below is an example instruction set that enables the fault identifier 304 to provide a particular textual output of 'Check for GPu MTTF' or 'Check for solder' in accordance with the examples disclosed herein.

if Equipment level=='GPU Fail'
'Check for GPu MTTF.'
if GPu MTTF_B>X_Current:
'Fault Type Invalid'
If GPu_Level_error='Solder':
'Check for solder' # No validity check for solder
Fault_Valid=True The fuzzy fault validator (FFV) 306 receives the output from the fault identifier 304 to validate and recheck the detection based on mean time to failure (MTTF) and other equipment properties. The FFV 306 processes the output from the fault identifier 304 to be one hot encoded in one example. One hot encoding is a technique used to encode categorical features into binary vectors that enable machine learning (ML) algorithms to better predict the outcomes. In addition, the FFV 306 receives information such as mean time to failure (MTTF), MTTFd from the historical data 148 related to device management. The FFV 306 can employ fault validation parameters such as but not limited to last replacement of a component, installation data of equipment, last fault resolution date, frequency of occurrence of faults, last maintenance procedures date, etc. retrieved from the historical data 148 to validate the output from the fault identifier 304. In an example, data from one or more of the repositories 142, 144, 146 can also be used in validation of the detected faults. In an example, if the output from the fault identifier 304 cannot be validated with the information from the various data sources including the historical data 148 and/or the repositories 142, 144, 146 further images can be extracted from the live data feed 102 for analysis by the fault predictor 116.

Figure 4:
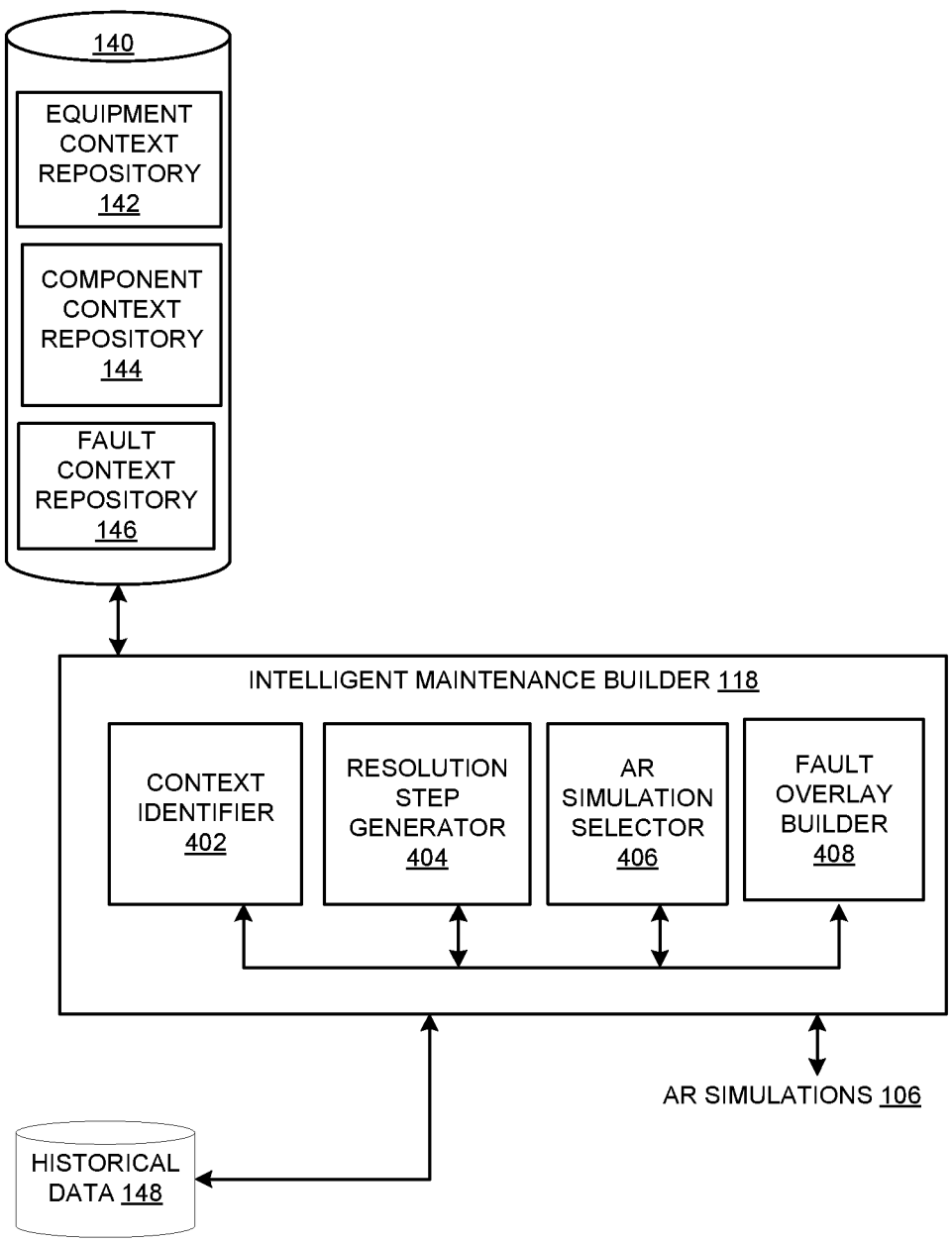
FIG. 4 shows an intelligent maintenance builder in accordance with the examples disclosed herein.

FIG. 4 shows the intelligent maintenance builder 118 in accordance with the examples disclosed herein. The intelligent maintenance builder 118 includes a context identifier 402, resolution step generator 404 and an AR simulation selector 406. As mentioned herein, the user begins to handle the faulty equipment at different levels of detail. Initially, the user may access the outer covering of the equipment and therefore deals at the equipment context level. Accordingly, information to generate a resolution step for the equipment context level is correspondingly retrieved from the equipment context repository 142. The context identifier 402 can keep track of a current context level of the faulty equipment that the user 150 is handling. In an example, the context levels associated with a given equipment or a piece of machinery can be stored in the device management data. Accordingly, different devices can have different context levels associated therewith depending on the complexity of the machine components. The context level enables identifying the appropriate ones of the repositories 142, 144 and 146 from which to retrieve the data.

The resolution step generator 404 employs the current context level to access the appropriate repository in order to obtain the data for generating a resolution step corresponding to the current context level. In an example, the resolution step generator 404 includes an ANN which runs the resolution step prediction algorithm. The ANN can be trained on past data based on the similar fault type in selecting a best possible resolution for each of the fault classes are detected by the fault identifier 304. The training data for the ANN can be collected by a recording resolution step implemented by experts in the past for a given fault type. Again ANN with one hot encoding can be used to classify the best resolution step. In an example, categorical_crossentropy can be used as a cost function.

The information regarding one or more selected resolution steps can be received by the AR simulation selector 406 which selects a corresponding AR simulation to be generated. In an example, the builder 118 can retrieve the AR simulation from the library of AR simulations 152 maintained within the data lake 160. Particular resolution steps can have one or more AR simulations associated therewith for execution serially or in parallel. As the user 150 proceeds from the equipment context level into deeper context levels the corresponding AR simulations are retrieved one after another upon the user 150 completing the corresponding steps.

The retrieved AR simulations are accessed by the overlay builder 408 for transmission and display to the user 150 at the user device 110. In an example, the fault overlay builder 408 can be included in the GPU 120 to reduce latency. In the later case, the retrieved AR simulation can be transmitted to the GPU 120 for communication to the user device 110. In an example, the AR simulation can include 3D holograms. The overlay builder 408 employs techniques such as but not limited to spatial mapping and point cloud for generating the AR simulation. Spatial mapping can create a map of space using dense triangular meshes and can be used to achieve occlusion, proper visualization and object placement. Point cloud includes a set of data points in a coordinate system (e.g. 3D Cartesian coordinate system) which are used to represent external surfaces of the object. The aforementioned techniques enable AR processor to generate a mesh of an object under observation such as the faulty equipment. Similarly, the mesh of a 3D model of the object under observation can be resized according to the generated mesh. The 3D model is then overlaid on an image of the actual object which is displayed to the user 150 on the screen of the user device 110. The processing using the spatial mapping and point cloud techniques can be executed at the maintenance system 100 or the GPU 120 and the resulting AR simulation is transmitted to the user device 110 for display to the user 150. The process of generating the overlay uses technology like interactive AR occlusion and collision detection. The AR simulations retrieved at each of the context levels achieved by the user 150 can be provided as an animated guidance procedure that lead the user 150 through the repair and maintenance processes. At each step the safety monitor 117 can be additionally configured to ensure that the corresponding safety measures are executed.

Figure 5:
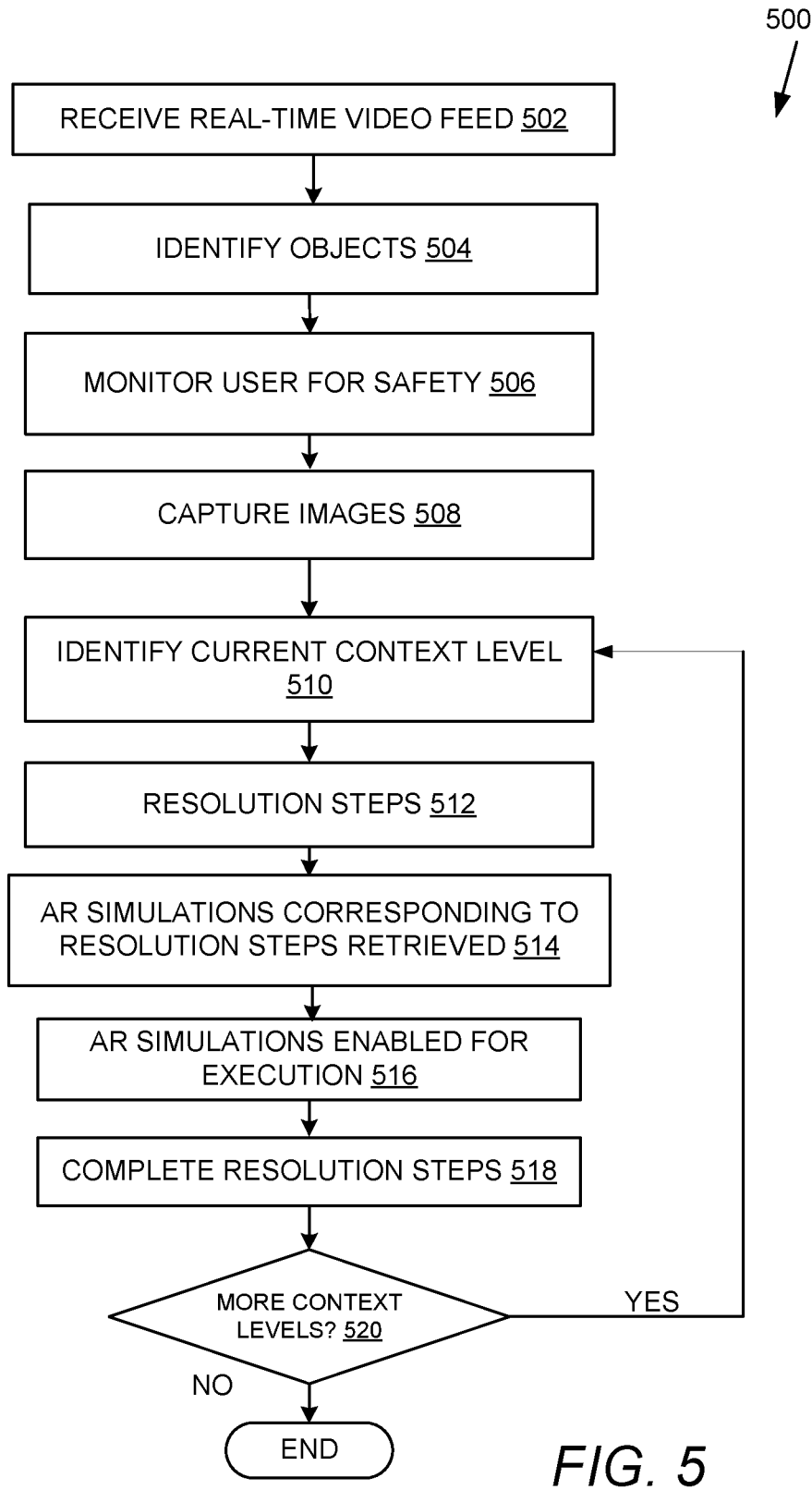
FIG. 5 is a flowchart that details an AI based method of enabling repairs of faulty equipment in accordance with the examples disclosed herein.

FIG. 5 is a flowchart 500 that details an AI based method of enabling repair of faulty equipment in accordance with examples disclosed herein. The method begins at 502 wherein real-time or live video feed of a location including the equipment is received at the maintenance system 100. The objects or the equipment in the live video feed 102 are identified in real-time at 504. Therefore the object identification can occur even as the maintenance system 100 continues to receive the live video feed 102 of the location. When the equipment or item to be worked on is identified within the live video feed 102, the user can be instructed on proper positioning of the user device 110 with respect to the equipment at 506. In addition, the user may also be monitored at 506 to ensure that the safety precautions are followed. At 508 images from the live video feed can be captured. At 510 the current context level at which the user 150 is handling the equipment is identified. At 512 the resolution steps associated with the current context level are generated. The resolution steps can include audio video instructions to the user 150 on handling the equipment. This can include instructions for disassembling the equipment or other such steps which can lead the user 150 to achieve the next context level or a deeper context level.

In an example, generation of the resolution steps can include determining or detecting faults associated with the faulty equipment at the current context level. It may be noted that detecting faults can include not only faults that exist currently on the faulty equipment but can also include predicting potential faults that can cause the faulty equipment to fail in short term. In an example, trained classifiers can classify images extracted at 502 into one or more of a plurality of fault classes. If one or more faults are detected at the current context level the resolution steps can further include instructions for repairing or mitigating effects of the faults on the functioning of the faulty machinery.

At 514, the AR simulations corresponding to the resolutions steps are retrieved from the library of AR simulations 152. The AR simulations are enabled for execution at the user device 110 at 516. At 518 it is detected if the user 150 has completed the necessary acts as suggested by the resolution steps. At 520, it is detected if further context levels that need to be executed by the user 150 exist for the equipment. If further context levels exist for handling by the user, the method returns to 510 to identify a next context level. If at 520, it is determined that no further context levels exist for execution by the user, the method terminates on the end block. It can be appreciated that the user 150 can navigate the plurality of context levels in different directions. For example, the user 150 can navigate the plurality of context levels from the equipment context level down to the fault context level and vice versa once a repair for the fault has been effected. At each context level, instructions corresponding to the acts to be executed by the user 150 are retrieved and supplied as AR simulations.

Figure 6:
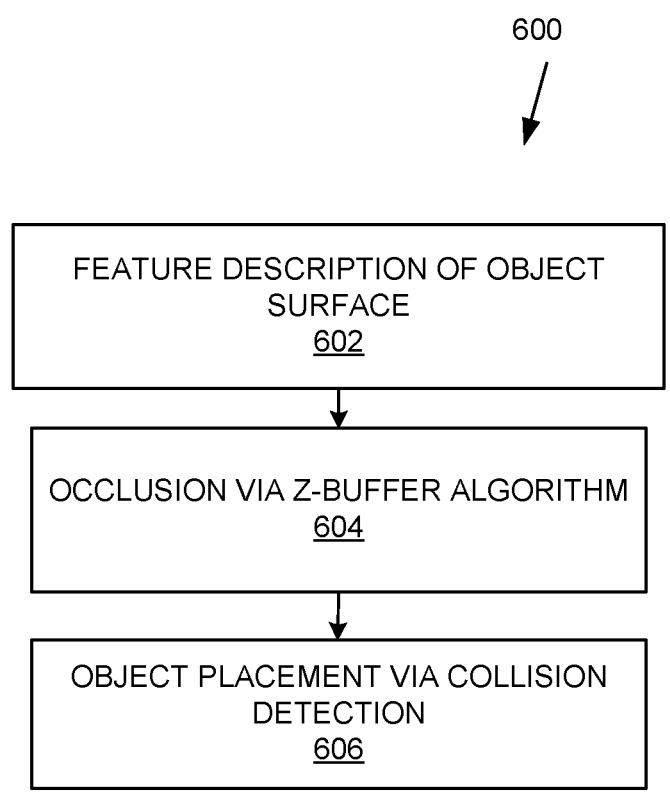
FIG. 6 shows a flow chart that details a method of overlaying an augmented reality (AR) simulation on an image of the faulty equipment in accordance with examples disclosed herein.

FIG. 6 shows a flow chart 600 that details a method of overlaying the AR simulation on an image of the faulty equipment in accordance with examples disclosed herein. The method begins at 602 wherein feature description of the object surface is obtained. The generation of feature description can include key point detection of the object surface. Using rotational projection statistics (RoPS) feature detection around key points is achieved. Considering a key point P on four different scales ($r_1, r_2, \ldots r_n$), for a local surface $L_k$ of radius $R_k$ centered at key point P having triangles Nt with vertices ($p_{1t}, p_{2t}, p_{3t}$), the scatter matrix can be defined as:

$$C_i = \frac{\int_0^1 \int_0^{1-v} (p_c(v,u) - p)(p_c(v,u) - p)^T du dv}{\int_0^1 \int_0^{1-s} dt ds} = \quad \text{(Eq. 7)}$$

$$\frac{1}{12}\sum_{j=1}^{3}\sum_{k=1}^{3}(p_{ij} - p)(p_{ik} - p)^T + \frac{1}{12}\sum_{j=1}^{3}(p_{ij} - p)(p_{ij} - p)^T$$

where $$p_c(v, u) = p_{i1} + v(p_{i2} - p_{i1}) + u(p_{i3} - p_{i1}) \quad \text{(Eq. 8)}$$

Where c=scatter matrix, t=triangles, p=vertices of t.
Calculating the scatter matrix for all the points and combining them to form a distribution matrix D(u, v) gives a feature description for the object.

At 604, occlusion via Z-Buffer is achieved. The Z-buffer algorithm is an algorithm used for pixel culling based on depth perception considering near and far value calculation.

$$z' = \frac{\text{far} + \text{near}}{\text{far} - \text{near}} + \frac{1}{z}\left(\frac{-2 \cdot \text{far} \cdot \text{near}}{\text{far} - \text{near}}\right) \quad \text{(Eq. 8)}$$

$$\frac{dz}{dz'} = \frac{-1 \cdot (-1) \cdot S \cdot \text{far} \cdot \text{near} \cdot (\text{far} - \text{near})}{\left(S \cdot \left(\frac{-\text{far} \cdot \text{near}}{z} + \text{far}\right) - \text{far} \cdot S\right)^2} = \quad \text{(Eq. 9)}$$

$$\frac{(\text{far} - \text{near}) \cdot z^2}{S \cdot \text{far} \cdot \text{near}} = \frac{z^2}{S \cdot \text{near}} - \frac{z^2}{S \cdot \text{far}} \approx \frac{z^2}{S \cdot \text{near}}$$

The value of the Z-buffer can take any value between [−1, 1]. Considering that the value is tentatively close to −1 can imply that the best results can be obtained if the object is close to the camera of the user device 110 around the near plane. Thus, occlusion helps to render the AI simulation such as the 3D holographic animation over the identified fault.

At 606, the placement of the virtual object, i.e. the AR simulation is achieved via collision detection. Object placement can be implemented using technologies that enable detection of collisions between a real and virtual objects with depth maps. This involves incrementally moving the virtual object in the direction of a "gravity" vector until a collision is detected. Once a collision is detected, a torque calculation can be performed around a collision point Pc to produce a rotation. The individual torques associated with each none constrained bounding box vertex are summed to produce the axis of rotation N. When, G=gravitational constant and P=vertices of the object, N is given by:

$$N = \sum_i (P_i - P_c) \times G_{pc} \quad \text{(Eq. 10)}$$

It can be assumed that the vertex, Pmax, with the longest moment arm, (i.e. the maximum (Pi−Pc) will move the greatest distance in the image when the virtual object is rotated after collision. The angle to achieve this one pixel movement is calculated via:

$$\theta = \arccos((P_{max} \cdot (P_{max} + G_{cc}))/(|P_{max}|*|P_{max} + G_{cc}|)). \quad \text{(Eq. 11)}$$

Various example user interfaces that show the generation and display of the AR simulations in accordance with examples disclosed herein are discussed below. It can be appreciated that the user interfaces are shown only by the way of illustration and that the examples discussed herein can be used where ever AR simulation generation enables step-wise execution of specific actions by the users on the real-world objects. While the below user interfaces show an AR simulation for the repair of a faulty electric motor, it can be appreciated that detection of context levels associated with any equipment that needs to be worked on can be similarly achieved. For example, the plurality of context levels disclosed herein can pertain to sequential steps of instructions for assembling an equipment from component parts or disassembling an equipment into its component parts and the like.

Figure 7:
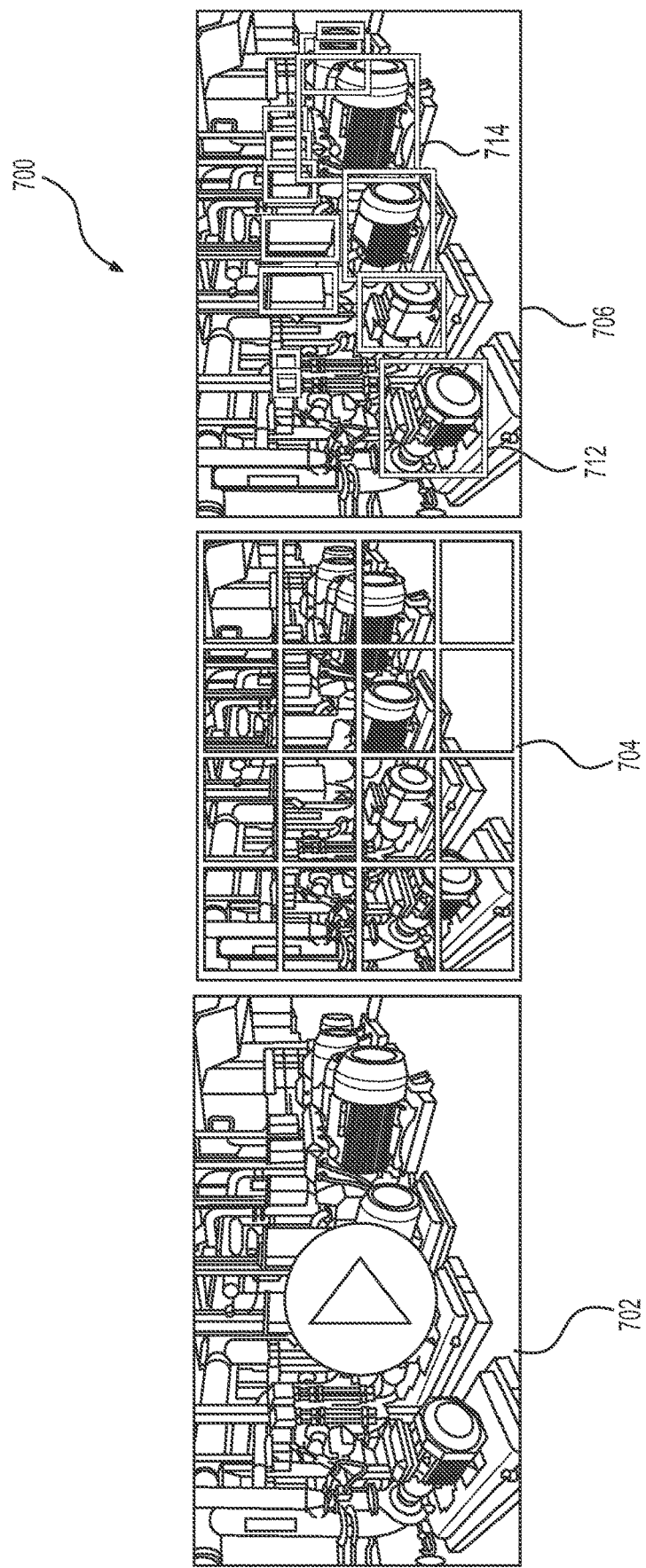
FIG. 7 shows a series of displays generated by the maintenance system during the object identification procedures as disclosed herein.

FIG. 7 shows a series of displays 700 generated by the maintenance system 100 during the object identification procedures as disclosed herein. An initial display includes a real-time video feed 702 that is initially transmitted by the user device 110 to the maintenance system 100. An initial image 704 extracted from the real-time video feed is split into a 3×3 grid of nine cells. The 3×3 grid is further analyzed to identify various objects which would include the faulty equipment. A probability class map which estimates probability of various classes of objects for each cell in the 3×3 grid can be generated. Based on the probability class map, the various objects are identified and marked out using the bounding boxes 712, 714 etc. as shown in the image 706.

Figure 8:
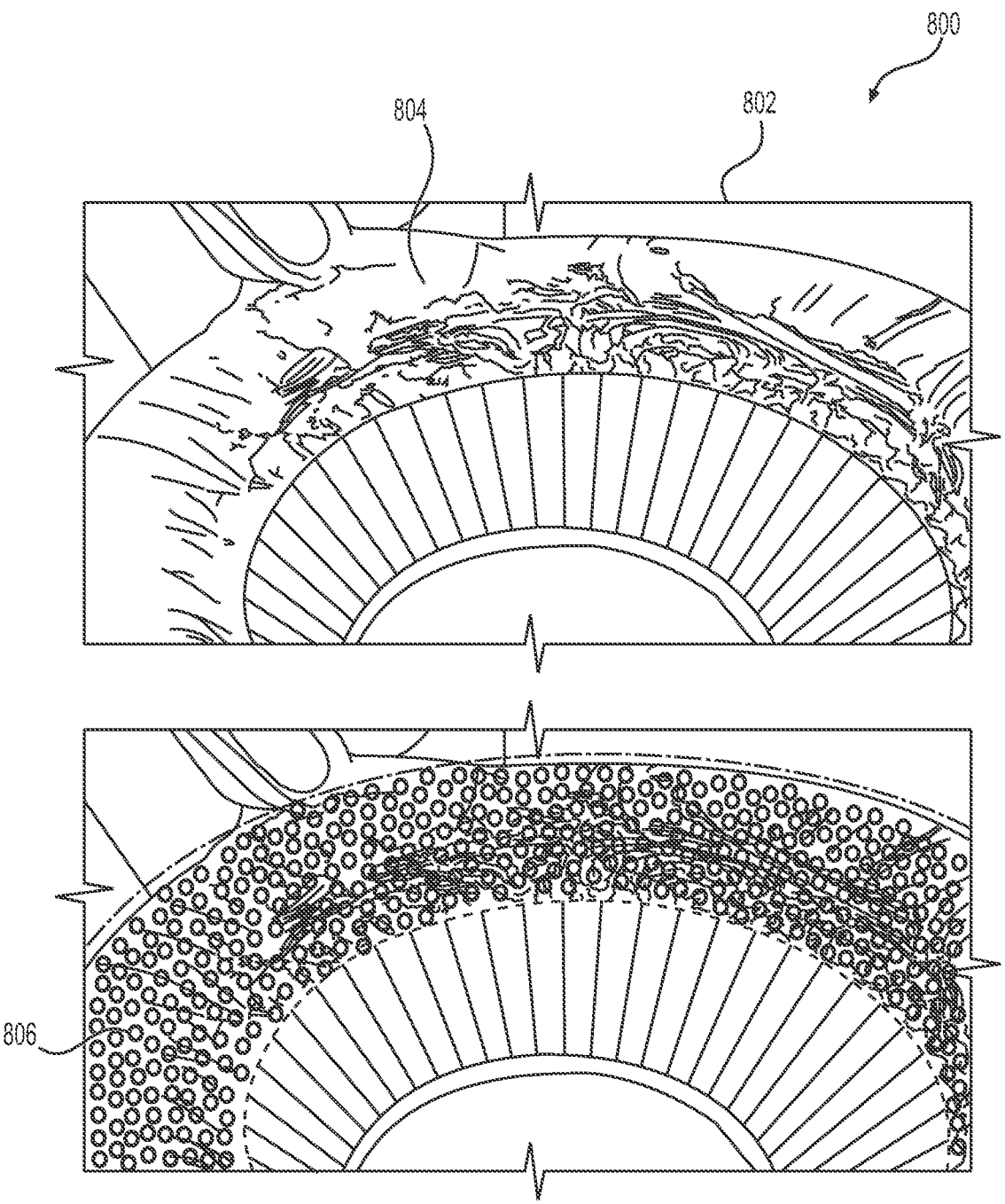
FIG. 8 shows a display which includes an image of a faulty component in accordance with the examples disclosed herein.

FIG. 8 shows a display 800 which includes an image 802 of a faulty component within the equipment shown in the initial image 704—which in this specific instance includes a burnt stator. A fault 804 which includes the burnt portion is clearly shown in the image 802. By employing spatial and point cloud methodologies, an AR simulation 806 is projected onto the image 802 to point out the burnt portion to the user 150.

Figure 9:
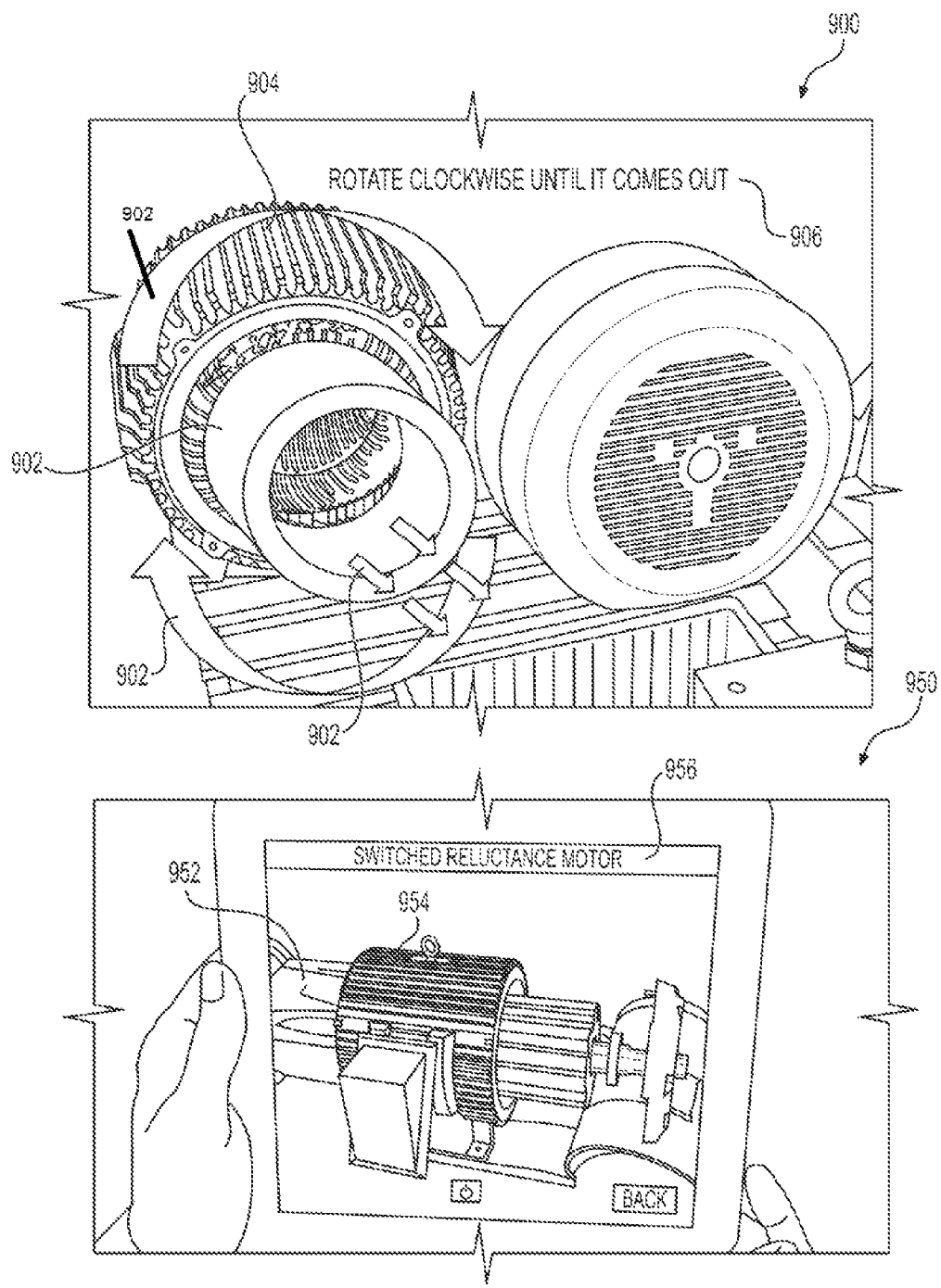
FIG. 9 shows displays that include AR simulations generated in accordance with the examples disclosed herein.

FIG. 9 shows a display 900 that includes an AR simulation 902 providing instructions on handling the equipment 904. The fault resolution steps are selected based on the severity of the fault detected. In addition, a textual instruction 906 is also provided to the user.

Another display 950 shows an AR simulation 954 on an equipment 952 generated in accordance with examples disclosed herein. A textual input 956 is also provided to the user.

The maintenance system 100 disclosed herein enables real-time equipment identification using customized darknet YOLO algorithm in addition to employing the GPU 122 on the cloud 120 to counter the hardware constraints of the user devices. The maintenance system 100 also enables providing step-by-step instructions to the user so that instructions in the succeeding steps or lower context levels are provided only when it is detected that the user has completed actions associated with instructions in the preceding steps or higher context levels. In addition, the maintenance system 100 includes elements whereby any new steps that are not already included in the instructions are recorded and used for further training of the maintenance system 100. The maintenance system 100 also enables fault identification and prediction in real-time using the image data and weighted attributes of a particular equipment as stored in the historical data 148 of equipment maintenance and failures.

Figure 10:
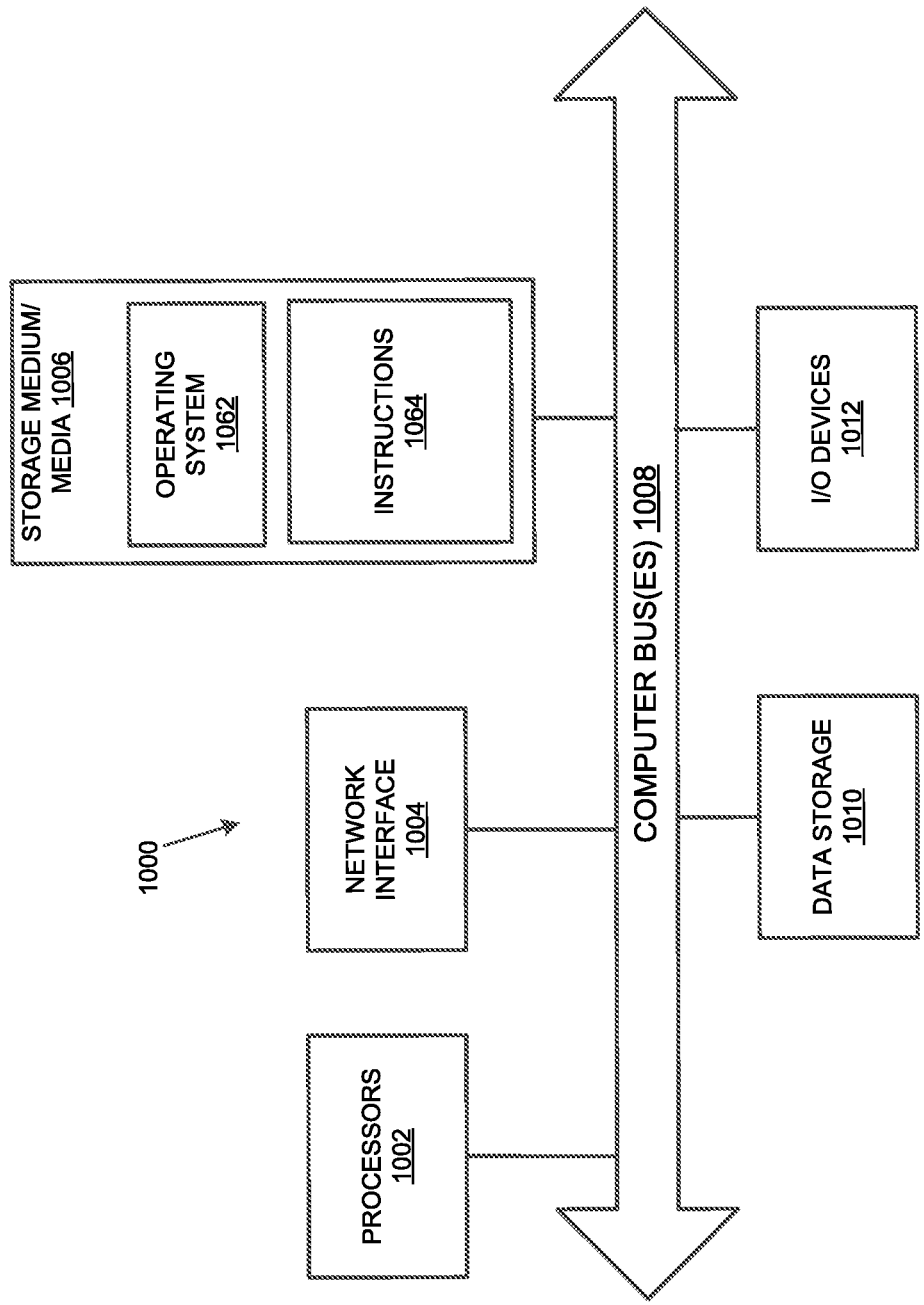
FIG. 10 illustrates a computer system that may be used to implement the maintenance system in accordance with the examples disclosed herein.

FIG. 10 illustrates a computer system 1000 that may be used to implement the maintenance system 100. More particularly, computing machines such as desktops, laptops, smartphones, tablets and wearables which may be used to generate or access the data from the maintenance system 100 may have the structure of the computer system 1000. The computer system 1000 may include additional components not shown and that some of the components described may be removed and/or modified. In another example, a computer system 1000 can sit on external-cloud platforms such as, Amazon Web Services, or internal corporate cloud computing clusters, or organizational computing resources, etc.

The computer system 1000 includes processor(s) 1002, such as a central processing unit, ASIC or other type of processing circuit, input/output devices 1012, such as a display, mouse keyboard, etc., a network interface 1004, such as a Local Area Network (LAN), a wireless 802.11x LAN, a 3G or 4G mobile WAN or a WiMax WAN, and a computer-readable medium 1006. Each of these components may be operatively coupled to a bus 1008. The computer-readable medium 1006 may be any suitable medium which participates in providing instructions to the processor(s) 1002 for execution. For example, the computer-readable medium 1006 may be non-transitory or non-volatile medium, such as a magnetic disk or solid-state non-volatile memory or volatile medium such as RAM. The instructions or modules stored on the computer-readable medium 1006 may include machine-readable instructions 1064 executed by the processor(s) 1002 to perform the methods and functions of the maintenance system 100.

The maintenance system 100 may be implemented as software stored on a non-transitory computer-readable medium and executed by the one or more processors 1002. For example, the computer-readable medium 1006 may store an operating system 1062, such as MAC OS, MS WINDOWS, UNIX, or LINUX, and code 1064 for the maintenance system 100. The operating system 1062 may be multi-user, multiprocessing, multitasking, multithreading, real-time and the like. For example, during runtime, the operating system 1062 is running and the code for the maintenance system 100 is executed by the processor(s) 1002.

The computer system 1000 may include a data storage 1010, which may include non-volatile data storage. The data storage 1010 stores any data used by the maintenance system 100. The data storage 1010 may be used to store the information regarding the current context level, the received images, the AR simulations and the like.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Augmented Reality (AR)-based fault detection and maintenance system comprising:
   at least one processor;
   a non-transitory computer readable medium storing machine-readable instructions that cause the at least one processor to:
   receive real-time video feed from a remote user device, the real-time video feed transmitting video of a facility including equipment;
   identify from the real-time video feed, using a trained AI-based object identifier, a faulty equipment to be worked on by a user associated with the user device;
   determine a context level that is currently applicable based on a state of the faulty equipment as detected in the real-time video feed, the current context level is one of a plurality of context levels corresponding to different states of the faulty equipment;
   provide AR simulations corresponding to resolution steps associated with the current context level, wherein the AR simulations include projections on an image of the faulty equipment on a screen of the user device and the AR simulations include one or more of audio and video animations correspoding to instructions that guide the user on acts to be executed per the resolution steps of the current context level;
   detect when the user has completed the acts for the resolution steps associated with the current context level;
   repeat the steps of determining the current context level, providing the AR simulations enabling the user to execute the acts associated with the resolution steps corresponding to the current context level and detecting when the user has completed the acts until no further context levels remain to be processed,
   wehrein the resolution steps of at least one context level of the plurality of context levels cause the at least one processor to:
      obtain using the trained AI-based object identifier, an input image from the real-time video feed, the input image including a component to be repaired within the faulty equipment;
      classify the input image into one of a plurality of fault classes using an AI-based fault identifier;

detect a fault associated with the component in the input image using historical data specific to the equipment and further based on weights associated with attributes of the component; and provide within the AR simulations corresponding to the at least one context level, instructions to the user for one of repair and maintenance of the faulty component.

2. The AR-based fault detection and maintenance system of claim 1, wherein the machine-readable instructions to identify a faulty equipment to be repaired comprise further machine-readable instructions that cause the at least one processor to:

split the input image into multiple grid cells; and predict using the AI-based object identifier, multiple bounding boxes within the grid cells and class probabilities for each of the multiple bounding boxes.

3. The AR-based fault detection and maintenance system of claim 2, wherein the AI-based object identifier implements a convolutional neural network (CNN).

4. The AR-based fault detection and maintenance system of claim 2, wherein the machine-readable instructions to obtain the input image comprise further machine-readable instructions that cause the at least one processor to:

receive a selection of one of the multiple bounding boxes; and identify a grid cell including a mid-point of the bounding box as including the component.

5. The AR-based fault detection and maintenance system of claim 1, wherein the machine-readable instructions to identify a faulty equipment to be repaired comprise further machine-readable instructions that cause the at least one processor to:

receive output from the AI-based object identifier; and extract one or more features from the input image.

6. The AR-based fault detection and maintenance system of claim 5, wherein the machine-readable instructions to classify the input image comprise further machine-readable instructions that cause the at least one processor to:

classify the input image into one of the plurality of fault classes based on the extracted features.

7. The AR-based fault detection and maintenance system of claim 1, wherein the non-transitory medium comprise furthers machine-readable instructions that cause the at least one processor to:

validate the detected fault based on a last maintenance procedure date of the faulty equipment.

8. The AR-based fault detection and maintenance system of claim 7, wherein the machine-readable instructions to validate the detected fault comprises further machine-readable instructions that cause the at least one processor to:

validate output from the AI-based fault identifier based on mean time to failure of the faulty equipment.

9. The AR-based fault detection and maintenance system of claim 8, wherein the machine-readable instructions to validate the detected fault comprises further machine-readable instructions that cause the at least one processor to:

detect an equipment id from the real-time video feed; and fetch information regarding the equipment from a device management historical data source using an equipment id detected in the real-time video feed.

10. The AR-based fault detection and maintenance system of claim 1, wherein the machine-readable instructions to provide a resolution step comprise further machine-readable instructions that cause the at least one processor to:

determine the current context level of the plurality of context levels achieved by the user repairing the equipment using a trained convolutional neural network (CNN);

access a context repository corresponding to the current level;

retrieve the respective resolution step based on data from the context repository.

11. The AR-based fault detection and maintenance system of claim 10, wherein the machine-readable instructions to provide a resolution step comprise further machine-readable instructions that cause the at least one processor to:

retrieve a relevant 3D hologram as the augmented reality (AR) projection to be displayed on the screen of the user device.

12. The AR-based fault detection and maintenance system of claim 10, wherein the machine-readable instructions to enable display of an augmented reality (AR) projection on the image comprise further machine-readable instructions that cause the at least one processor to enable a graphics processing unit (GPU) to:

generate a mesh of the equipment using spatial mapping and point cloud techniques; and resize a mesh of a 3D model of the equipment in a data store based on a size of the generated mesh.

13. The AR-based fault detection and maintenance system of claim 12, wherein the machine-readable instructions to enable display of an augmented reality (AR) projection on the image comprise further machine-readable instructions that cause the at least one processor to enable a graphics processing unit (GPU) to:

overlay a 3D hologram based on the 3D model over the image of the component using interactive AR occlusion and collision detection; and provide an animated guidance to the user via animating the 3D hologram on the screen of the user device.

14. The AR-based fault detection and maintenance system of claim 1, wherein the faults include one or more of thermal damage, corrosion, wear-and-tear and burns.

15. An Artificial intelligence (AI)/Augmented reality (AR) based method of monitoring an equipment comprising:

analyzing real-time video feed transmitted by a user device, the real-time video feed including images of a facility including an equipment to be worked on;

obtaining an input image including the equipment from the real-time video feed;

determining a current context level that is applicable to the equipment in response to obtaining the input image, the current context level is determined based on a state of the equipment as detected in the real-time video feed and the current context level is one of a plurality of context levels associated with different states of the equipment;

retrieving a resolution step that provides instructions for at least an act to be executed by the user on the equipment, the resolution step being retrieved based on the current context level;

obtaining an AR simulation to be provided to the user on the user device, the AR simulation corresponding to the resolution step and the AR simulation including projections on the input image of the equipment on the user device and the AR simulation includes one or more of audio and video animations corresponding to the instructions;

enabling a display of the AR simulation on a current image of the equipment on the user device;

detecting when the user has completed the acts for the resolution steps associated with the current context level; and repeating the steps of determining the current context level, providing the AR simulations enabling the user to execute the acts associated with the resolution steps corresponding to the current context level and detecting when the user has completed the acts, until no further context levels remain to be processed.

16. The method of claim 15, further comprising:

detecting one or more faults within the equipment by classifying the input image into one or more of a plurality of fault classes using image features of the input image;

validating the one or more faults that are detected based on a last maintenance procedure date of the equipment; and enabling overlay of the AR simulation corresponding to a final context level of the plurality of context levels on the image of the equipment, the AR simulation including the instructions to the user for handling at least one of the faults associated with the equipment.

17. The method of claim 15 wherein a first context level of the plurality of context levels corresponds to beginning an assembly of the equipment and the final context level of the plurality of context levels corresponds to a final step which completes the assembly of the equipment.

18. A non-transitory storage medium comprising machine-readable instructions that cause at least one processor to:

receive real-time video feed from a remote user device, the real-time video feed transmitting video of a facility including equipment;

identify from the real-time video feed, using a trained AI-based object identifier, a faulty equipment to be repaired;

determine a context level that is currently applicable based on a state of the faulty equipment as detected in the real-time video feed, the current context level is one of a plurality of context levels corresponding to different states of the faulty equipment;

provide AR simulations corresponding to resolution steps associated with the current context level, wherein the AR simulations include projections on an image of the faulty equipment on a screen of the user device and the AR simulations guide the user on acts to be executed per the resolution steps of the current context level;

detect when the user has completed the acts for the resolution steps associated with the current context level;

repeat the steps of determining the current context level and providing the AR simulations enabling the user to exectue the acts associated with the resolution steps corresponding to the current context level until no further context levels remain to be processed, wherein the resolution steps of at least one context level of the plurality of context levels cause the at least one processor to:

obtain using the trained AI-based object identifier, an input image from the real-time video feed, the input image including a component to be repaired within the faulty equipment;

classify the input image into one of a plurality of fault classes using an AI-based fault identifier;

detect a fault associated with the component in the input image based on a comparison of the input image with historical data specific to the equipment and further based on weights associated with attributes of the component;

provide within the AR simulations corresponding to the at least one context level, instructions to the user for one of repair and maintenance of the faulty component.

19. The non-transitory storage medium of claim 18, further comprising machine-readable instructions that cause at least one processor to:

detecting, via analysis of the real-time video feed, an additional step executed by the user during execution of the respective resolution steps for each of the plurality of context levels.

20. The non-transitory storage medium of claim 19, further comprising machine-readable instructions that cause at least one processor to:

recording the additional step executed by the user for future use.

* * * * *

UNITED STATES PATENT AND TRADEMARK OFFICE
CERTIFICATE OF CORRECTION

PATENT NO. : 10,768,605 B2
APPLICATION NO. : 16/121744
DATED : September 8, 2020
INVENTOR(S) : Tanmay Dalal et al.

Page 1 of 1

It is certified that error appears in the above-identified patent and that said Letters Patent is hereby corrected as shown below:

In the Claims

In Column 14, Line 47, Claim 1, "correspoding" should read "corresponding".
In Column 14, Line 59, Claim 1, "wehrein" should read "wherein".
In Column 18, Line 10, Claim 18, "exectue" should read "execute".

Signed and Sealed this
Eleventh Day of May, 2021

Drew Hirshfeld
*Performing the Functions and Duties of the
Under Secretary of Commerce for Intellectual Property and
Director of the United States Patent and Trademark Office*